United States Patent [19]

Krein et al.

[11] 4,090,624
[45] May 23, 1978

[54] ROUND BALE TRANSPORTER

[76] Inventors: Vernon R. Krein; Lawrence D. Elmer, 425 South Grove, both of Hebron, N. Dak. 58638

[21] Appl. No.: 652,415

[22] Filed: Jan. 26, 1976

[51] Int. Cl.² .................. B65H 75/42; B66F 9/18
[52] U.S. Cl. .................. 214/77 R; 172/501; 214/78; 214/130 C; 214/DIG. 1; 242/86.5 R
[58] Field of Search .......... 214/75, 77 R, 78, 79, 214/130 C, DIG. 4; 212/9; 74/53, 89, 512, 513, 818, 820; 296/6–12; 119/60; 242/86.5, 86.52, 86.1, 94; 172/501, 502

[56] References Cited

U.S. PATENT DOCUMENTS

| 225,304 | 3/1880 | Stauffacher | 172/501 |
|---|---|---|---|
| 2,626,548 | 1/1953 | Williams | 172/501 |
| 2,775,800 | 1/1957 | Ellms | 74/89 |
| 2,970,659 | 2/1961 | Bunting et al. | 172/501 |
| 3,036,790 | 5/1962 | Rheinberger | 242/86.5 |
| 3,067,966 | 12/1962 | Hicks | 242/86.5 R |
| 3,524,508 | 8/1970 | West | 172/501 X |
| 3,779,208 | 12/1973 | Gay | 119/1 |
| 3,797,580 | 3/1974 | Roth | 172/501 X |
| 3,880,305 | 4/1975 | Van Polen | 242/86.52 |
| 3,908,846 | 9/1975 | Brummitt | 214/147 G |
| 3,968,940 | 7/1976 | Godbersen | 214/DIG. 4 X |
| 4,025,006 | 5/1977 | Turnbow | 214/DIG. 4 |
| 4,042,140 | 8/1977 | McFarland | 214/78 X |

*Primary Examiner*—Drayton E. Hoffman
*Assistant Examiner*—Carl Rowold
*Attorney, Agent, or Firm*—Merchant, Gould, Smith, Edell, Welter & Schmidt

[57] ABSTRACT

Apparatus for handling, transporting, and unrolling large cylindrical bales of hay, including a frame mountable in the box of a pickup truck or on its own wheels. Hydraulic controls and actuators are provided for pivoting a bale fork about a horizontal axis, and for spreading and drawing together a pair of arms making up the fork to grasp and release the bale axially. A lost motion mechanism is provided to permit the fork to move vertically, as a bale unrolls, although the hydraulically actuated portion of the fork remains motionless.

2 Claims, 4 Drawing Figures

ROUND BALE TRANSPORTER

BACKGROUND OF THE INVENTION

This invention relates to the field of agriculture, and specifically comprises new and useful apparatus for the handling of cylindrical hay bales.

For many years bales of hay have been rectangular, with two ties going around them lengthwise to keep them from disintegrating. Such bales are slightly more than a foot square, somewhat less then 3 feet long, and weight less than 100 pounds. Single bales of this sort are relatively easily handled by a workman without any special equipment, although in large numbers auxiliary apparatus such as conveyor hoists are welcome adjuncts.

In later times, there has been developed apparatus for producing cylindrical bales of hay in which the ties are circumferential. Such bales are relatively enormous: they may be up to 5 feet in diameter and length and 1500 pounds in weight. After making them the baler leaves them lying on their sides in the field. They obviously cannot be manipulated practically by hand. Our invention relates to means whereby such large cylindrical bales may be handled and transported.

In feed lot operation it is common to use one of these large bales by cutting its ties and simply unrolling it along the ground for livestock to eat. Our invention includes special lost motion means for facilitating the unrollment of such bales, to enable it to be accomplished automatically and more rapidly than heretofore.

SUMMARY OF THE INVENTION

The above results are accomplished by an arrangement designed for mounting in a pickup truck, or on its own wheels, or on the three point hitch of a tractor, the arrangement including a fork having two arms whose outer ends may be spread apart and drawn together, the arms having means at the outer ends for penetrating the ends of a bale at their centers as the arms come together. Means are further included to pivot the arms about a common axis lying outside the bale and parallel to its axis, lifting the bale into a supported position off the ground. Hydraulic means to accomplish the above motions are provided, together with lost motion means enabling the arms to pivot toward the ground, independently of the hydraulic system, as the bale unrolls, to keep it in contact with the ground as its diameter decreases.

Various advantages and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

Figure 2:
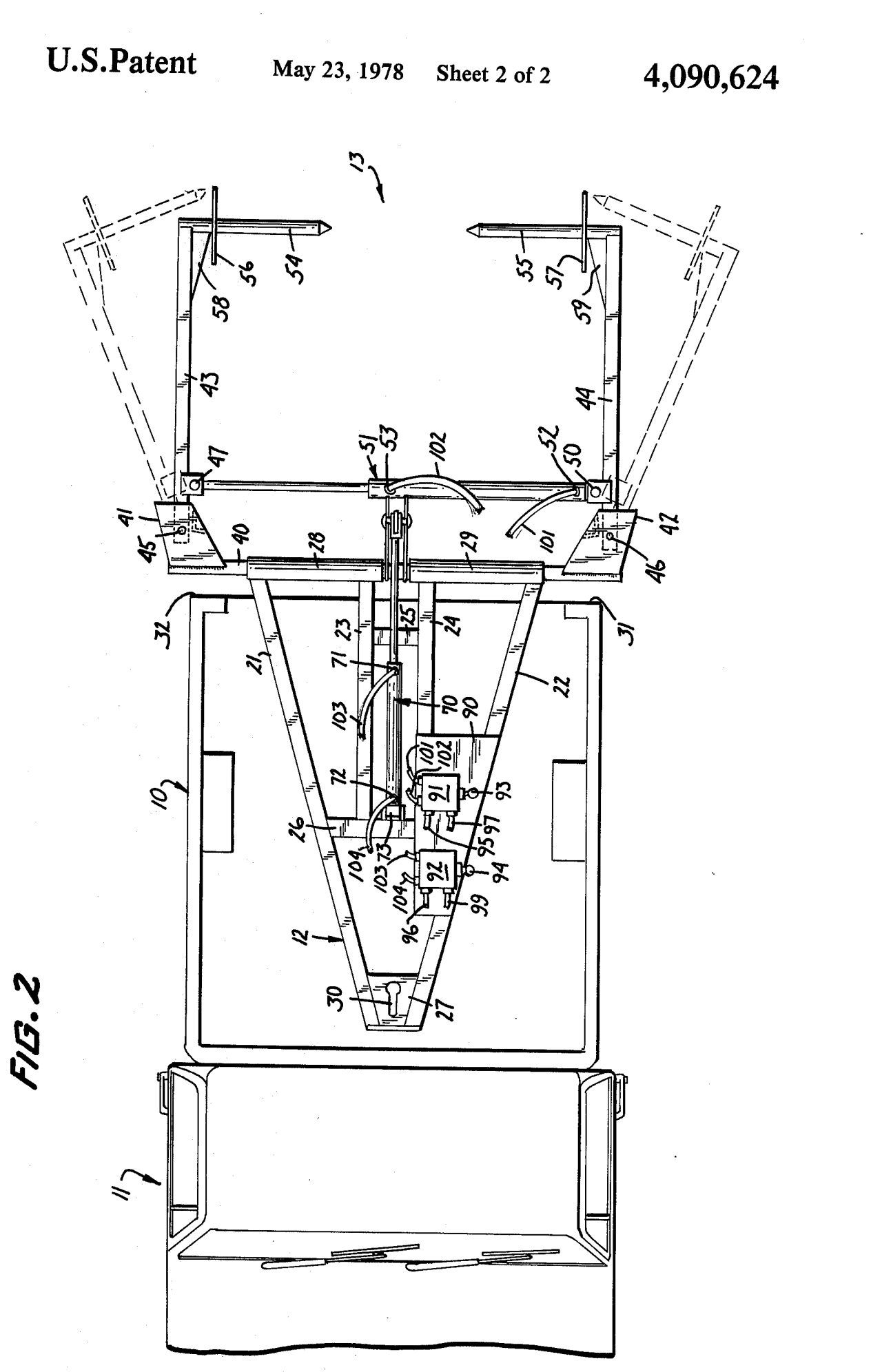

FIG. 2 is a plan view of the apparatus of FIG. 1 in first and second positions.

DESCRIPTION OF THE PREFERRED EMBODIMENT

Figure 1:
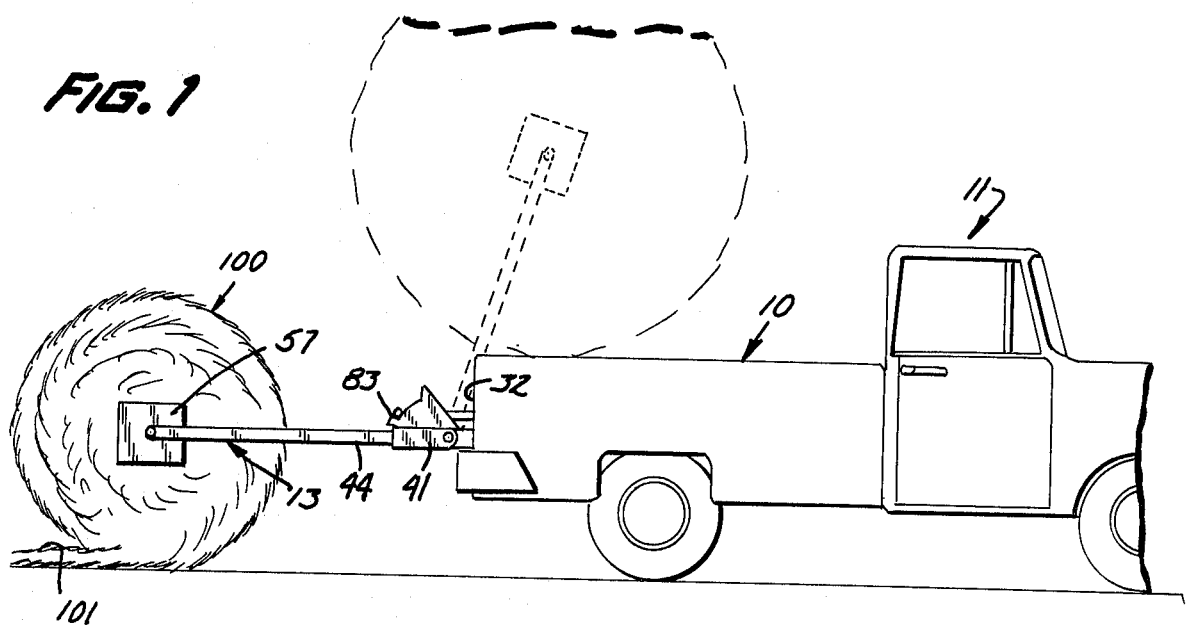
FIG. 1 is a side view of our invention installed in the box of a pickup truck, showing the apparatus in first and second positions of use.

The drawing shows our invention installed in the box 10 of a pickup truck 11, from which the tailgate has been removed. The apparatus includes a mounting frame 12 to which is pivoted a bale fork 13. Frame 12 comprises side members 21 and 22, longitudinal members 23 and 24, cross braces 25 and 26, a gusset 27, and a pair of coaxial tubular end members 28 and 29, all secured rigidly together as by welding. For versatility, gusset 27 may be provided with an aperture 30 to receive a trailer hitch ball or similar item. The frame is secured to the bottom of the truck box by an suitable means not shown, with members 28 and 29 extending rearwardly beyond the ends 31, 32 of the truck box.

Fork 13 comprises a shaft 40 pivotally received in members 28 and 29 and projecting therebeyond to carry at its ends a pair of brackets 41 and 42 to which a pair of arms 43 and 44 are pivoted about axes 45 and 46 orthogonal to the axis of shaft 40 and parallel to one another. Pivoted to arms 43 and 44 about axes 47 and 50 parallel to axes 44 and 45 is a first linear hydraulic actuator 51 having connections 52 and 53 for hydraulic fluid flow. The ends of arms 43 and 44 carry bale piercing axle members 54 and 55, with pressure plates 56 and 57, all respectively, the joints being made rigid by welding to gussets 58 and 59, for example.

A second linear hydraulic actuator 70 is provided for causing pivotal movement of fork 13 in members 28 and 29, and has connections 71 and 72 for hydraulic fluid. Actuator 70 is pivoted at the forward end to a bracket 73 on cross piece 26. At the rearward end actuator 70 is connected by a pivoted cross pin 74 between a pair of links 75 and 76, loosely pivoted as by a rivet 77 between a pair of parallel crank arms 80 and 81 welded to shaft 40 to project radially therefrom. The ends of pin 74 project beyond links 75 and 76 at 82 and 83, and arms 80 and 81 have arcuate cutouts 84 in which pin ends 82 and 83 may move between stop abutments 85 and 86. Elements 74-86 comprise a lost-motion linkage 87.

Figure 3:
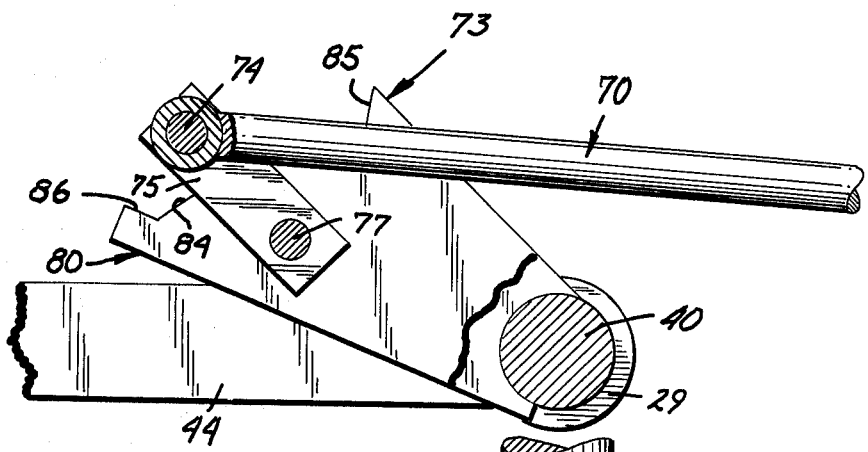
FIGS. 3 and 4 are fragmentary views to a larger scale showing in elevation and plan a lost motion mechanism used in the invention.
Figure 4:
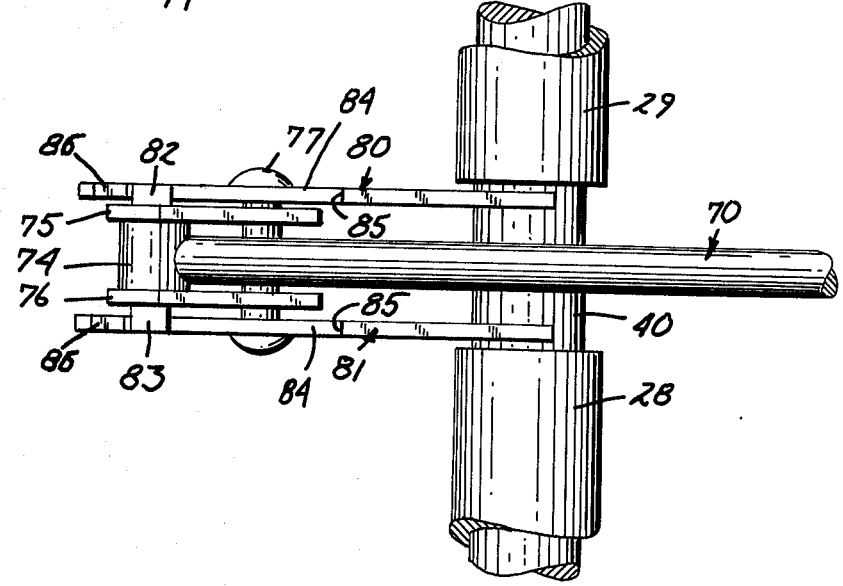

When actuator 70 moves to the right in FIG. 3, ends 82 and 83 of member 74 move into engagement with abutments 85, and thereafter cause clockwise rotation of arms 80 and 81 and shaft 40, raising arms 43 and 44 to the vertical position. After the vertical is passed, the weight of fork 13, even when unloaded, causes shaft 40 to continue rotating in the same direction: abutments 85 move away from ends 82 and 83 until this motion is arrested by contact of ends 82 and 83 with abutments 86 at the end of a lost motion travel determined by the angular displacement between abutments 85 and abutments 86. The arms may be lowered by a further operation of actuator 70, in a forward direction on the vehicle, to any extent desired or permitted by the dimensions of the load.

Now when actuator 70 moves to the left, ends 82 and 83 act on abutments 86 to cause counterclockwise rotation of shaft 40, again raising arms 43 and 44 to the vertical. After the vertical is passed, the weight of fork 13 causes shaft 40 to continue rotating in the same direction: abutments 86 now move away from ends 82 and 83 until this movement is arrested by contact of ends 82 and 83 with abutments 85 at the end of the lost motion travel. Arms 43 and 44 may now be lowered by continued operation actuator 70, in rearward direction in the vehicle, even to the point where pressure plates 56 and 57 touch the ground.

Energization of actuators 50 and 70 is controlled as follows: mounted on a base plate 90 secured to the top of frame 12 at a convenient location are a pair of hydraulic controls 91 and 92 having manual operating members 93 and 94, supplied with hydraulic fluid through hoses 95 and 96, and discharging to a hydraulic reservoir through hoses 97 and 99. Control 91 energizes actuator 51 through hoses 101 and 102, and control 92 energizes actuator 70 through hoses 103 and 104.

While frame 21 is shown as secured in a truck box, it will be appreciated that the frame can also be mounted on wheels of its own, if desired, and the invention is believed to be broad enough to encompass this embodiment.

The operation of the apparatus will be described in the performance of typical tasks. First, suppose that hay has been cut and baled, and the tied bales lying in the field are to be transported to a storage area. The vehicle is moved into the field and positioned adjacent a bale to be moved, and the hydraulic pump is placed in operation to provide actuator energizing fluid.

By means of manual members 93 and 94 fork 13 is brought into a position where members 54 and 55 are substantially at the height of the axis of the bale, and arms 43 and 44 are widespread. The vehicle is backed until members 54 and 55 are aligned with the bale axis, and manual member 93 is operated to supply hydraulic fluid to connection 53 of actuator 51, drawing arms 43 and 44 together so that axle members 54 and 55 are forced into the ends of the bale until the latter are engaged by plates 56 and 57. Manual member 94 is now operated to supply hydraulic fluid to connection 71 of actuator 70, causing fork 13 to rise past the vertical position, pass through the lost motion travel, and lower the bale to rest on the edges of the truck box, or on a suitable platform within the box and over controls 91 and 92.

The vehicle may now move off carrying the bales securely. The arrangement in fact is so secure that the truck may move, on highways, at highway speeds, no speed reduction being necessary because of the load.

When the storage area is reached, the truck is moved into an appropriate position, usually by backing, and controller 92 is used to reversely energize actuator 70, lifting the bale from its transport location and lowering it to the ground, after which control 91 is used to withdraw members 54 and 55 from the bale.

In the procedure described above, the loading can be accomplished from either side of the bale indiscriminately, and the provision of the lost motion travel is not essential to the operation. In another common task, however, it is desired to unroll a bale 100 into a flat sheet or blanket 101 from which livestock can feed. In this case, shown specifically on FIG. 1, the bale must be lifted from a particular side, so that later when it is lowered it may unroll, after its ties are cut, as it rolls along the ground pulled by the vehicle. The strength of the web of hay is not reliably sufficient to cause the bale to rotate, and peripheral contact with the ground is necessary for that purpose. It will be appreciated that as the bale unwinds arms 43 and 44 must pivot downwardly to maintain the desired ground contact. Without the lost motion mechanism it would be necessary for an operator to ride in the vehicle during the unwinding, operating member 92 to extend actuator 70 and hence cause downward movement of the arms. The lost motion mechanism makes this unnecessary.

To unroll a bale, the operator first rotates arms 43 and 44 counterclockwise until the bale lies on its side on the ground: during this process ends 82-83 are in engagement with abutment 85. The rotation is continued, however, so that ends 82 and 83 leave contact with abutment 85 and move toward contact with abutments 86: before this contact is quite reached actuator operation is terminated. The bale ties are now cut. Note that these operation can all be done by the truck driver dismounted from his vehicle, no second workman being needed. Now when the truck is moved forward the bale unwinds, and as its effective diameter decreases arms 80 and 81 move abutments 86 away from contact with ends 82 and 83. Thus, no continuous adjustment of control 92 is necessary. When the bale is completely unrolled, the truck may be stopped if necessary to raise the fork into a higher position.

From the above it will be evident that we have invented a new and useful apparatus for the handling, transportation and unrolling of large cylindrical hay bales. While shown more particularly as fastened in the box of a pickup truck, the apparatus can also be provided with its own wheels to be pulled as a trailer behind a vehicle having a hydraulic fluid system. The arrangement obviates the need for a second operator when a bale is being unrolled, by reason of a lost motion mechanism provided for that purpose. When used with a pickup truck, the bale is carried so securely that the truck can travel on highways at highway speeds.

Numerous characteristics and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In a bale transporter, in combination:
a generally horizontal frame;
a shaft pivoted in said frame about a horizontal axis;
a pair of arms pivoted at first ends near the opposite ends of said shaft, respectively;
bale piercing axle means at the ends of said arms directed toward one another;
first hydraulic means for causing pivotal movement of said arms toward and away from one another;
and second hydraulic means, including a lost motion mechanism, for causing pivotal movement of said shaft through a range of greater than 90°, so that said arms may move from a position below the horizontal to a position beyond the vertical, said lost motion mechanism including;
a crank arm secured to said shaft and having a pair of opposed abutments angularly spaced about a center;
link means pivoted at one end to said crank arm at said center;
a hydraulic actuating member movable generally orthogonally with respect to said shaft;
and means pivotally connecting said link means to said actuating member in a position to engage either of said abutments as determined by the pivotal movement of said link means with respect to said crank arm.

2. In a bale transporter, in combination:

a generally horizontal frame;

a shaft pivoted in said frame about a horizontal axis;

a pair of arms pivoted at first ends near the opposite ends of said shaft, respectively;

bale piercing axle means at the ends of said arms directed toward one another;

first hydraulic means for causing pivotal movement of said arms toward and away from one another;

and second hydraulic means including a lost motion mechanism for causing pivotal movement of said shaft through a range of greater than 90°, so that said arms may move from a position below the horizontal to a position beyond the vertical, said lost motion mechanism including;

a shaft to be driven in pivotal movement about a first horizontal axis;

a crank arm secured to said shaft for movement unitary therewith;

a link pivoted at one end to said crank arm for movement about a second axis spaced from and parallel to said first axis;

a drive member movable orthogonally with respect to said axis and pivoted to the other end of said link for movement about a third axis spaced from and parallel to said first and second axes;

opposed abutments carried by said crank arm and angularly displaced about said second axis;

and means carried by said link for movement between said abutments, whereby movement of said drive member initially causes said link to pivot with respect to said crank arm until the last named means engages one of said abutments, and further movement of said drive member in the same direction causes movement of said crank arm and shaft about said first axis.

* * * * *